United States Patent
Kuo et al.

(10) Patent No.: US 9,699,390 B2
(45) Date of Patent: Jul. 4, 2017

(54) CONTROLLING METHOD FOR IMAGE CAPTURING AND IMAGE INTEGRATION

(71) Applicant: HTC Corporation, Taoyuan (TW)

(72) Inventors: Ting-Chia Kuo, Taoyuan (TW); Hui-Ping Chen, Taoyuan (TW); Nicole Pauline Sangco, Seattle, WA (US); Sung-Hao Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/660,919

(22) Filed: Mar. 17, 2015

(65) Prior Publication Data

US 2016/0065825 A1   Mar. 3, 2016

Related U.S. Application Data

(60) Provisional application No. 62/044,431, filed on Sep. 2, 2014.

(51) Int. Cl.

| H04N 5/265 | (2006.01) |
|---|---|
| H04N 1/21 | (2006.01) |
| H04N 5/262 | (2006.01) |
| H04N 5/225 | (2006.01) |
| H04N 5/232 | (2006.01) |

(52) U.S. Cl.
CPC .......... *H04N 5/265* (2013.01); *H04N 1/212* (2013.01); *H04N 5/2258* (2013.01); *H04N 5/23293* (2013.01); *H04N 5/2624* (2013.01)

(58) Field of Classification Search
CPC ............ H04N 5/2258; H04N 5/23203; H04N 5/23238; H04N 5/247; H04N 5/2624; H04N 5/265; H04N 5/3415; H04N 3/1593; H04N 1/212; H04N 5/23293; G06T 3/4038; G06T 2200/32; G03B 37/00–37/06

See application file for complete search history.

(56) References Cited

U.S. PATENT DOCUMENTS

| 2002/0196348 A1* | 12/2002 | Kubo | H04N 5/772 348/220.1 |
|---|---|---|---|
| 2003/0202110 A1* | 10/2003 | Owens | H04N 1/00283 348/222.1 |
| 2009/0122134 A1* | 5/2009 | Joung | H04N 13/0066 348/42 |
| 2012/0033039 A1* | 2/2012 | Sasaki | H04N 13/0029 348/43 |
| 2012/0105579 A1* | 5/2012 | Jeon | H04N 5/2258 348/38 |
| 2012/0154534 A1* | 6/2012 | Suh | H04N 13/0048 348/43 |
| 2012/0262546 A1* | 10/2012 | Tsukagoshi | H04N 13/0029 348/43 |
| 2015/0138314 A1* | 5/2015 | Vincent | H04N 5/23238 348/38 |

* cited by examiner

*Primary Examiner* — Dennis Hogue
(74) *Attorney, Agent, or Firm* — CKC & Partners Co., Ltd.

(57) ABSTRACT

A controlling method, suitable for a first camera unit and a second camera unit, is disclosed herein. The controlling method include following steps. The first camera unit is triggered to generate a first media data by shooting a first image or recording a first video. In response to the first media data is generated, the second camera unit is automatically triggered to generate a second media data by shooting a second image or recording a second video. The first media data and the second media data are configured to be integrated into a third media data.

8 Claims, 9 Drawing Sheets

CONTROLLING METHOD FOR IMAGE CAPTURING AND IMAGE INTEGRATION

RELATED APPLICATIONS

This application claims the priority benefit of U.S. Provisional Application Ser. No. 62/044,431, filed Sep. 2, 2014, which is herein incorporated by reference.

BACKGROUND

Field of Invention

The present application relates to an image capturing device. More particularly, the present application relates to a controlling method for triggering the image capturing device to capture images and/or videos automatically.

Description of Related Art

Recently, the increasing popularity of the social network makes people share their status and photos more frequently. Since the photos shared are normally taken by the mobile device (e.g., cell phones, tablets, etc.), image related application programs of the mobile device are forced to be equipped with some necessary features, such as selfie-shooting, filtering, photo-editing toolbox, etc.

However, some of the features require complicated procedures to activate. For example, when the user would like to stitch two images/videos captured by two different cameras into a single image/video, the user is required to complete a long procedure including capturing one image/video by a camera, switching to another camera, capturing another image/video by the following camera, and resizing two different images/videos such that the images/videos are matched for stitching.

SUMMARY

An aspect of the present disclosure is to provide a controlling method suitable for a first camera unit and a second camera unit. The controlling method include following steps. The first camera unit is triggered to generate a first media data by shooting a first image or recording a first video. In response to the first media data is generated, the second camera unit is automatically triggered to generate a second media data by shooting a second image or recording a second video. The first media data and the second media data are configured to be integrated into a third media data.

Another aspect of the present disclosure is to provide an electronic apparatus, which includes a control unit. The control unit is operatively connected to a first camera unit and a second camera unit. The control, unit being adapted to trigger the first camera unit to generate a first media data by shooting a first image or recording a first video, and automatically trigger the second camera unit to generate a second media data by shooting a second image or recording a second video in response to the first media data is generated.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
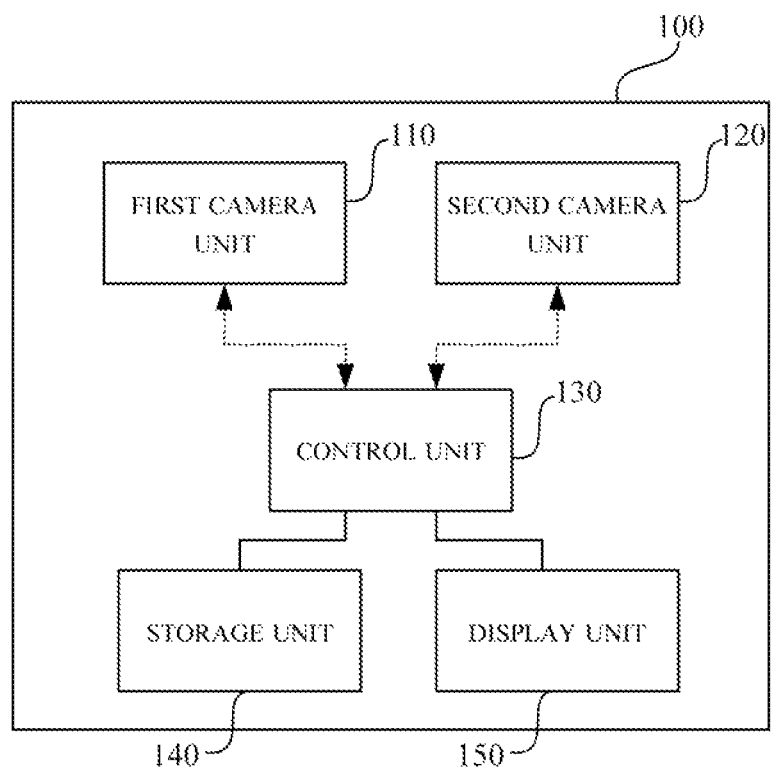
FIG. 1 is a schematic diagram illustrating an electronic apparatus according to an embodiment of the disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a schematic diagram illustrating an electronic apparatus 100 according to an embodiment of the disclosure. As shown in FIG. 1, the electronic apparatus 100 includes a first camera unit 110, a second camera unit 120, a control unit 130, a storage unit 140 and a display unit 150. In the embodiments, the electronic apparatus 100 can be a mobile phone, a smart phone, a smart camera, a tablet, or an equivalent device.

The control unit 130 is operatively connected to the first camera unit 110, the second camera unit 120, the storage unit 140 and the display unit 150. As shown in FIG. 1, the first camera unit 110 and the second camera unit 120 are disposed in the electronic apparatus 100, such that the control unit 130 is able to be electrically connected to the first camera unit 110 and the second camera unit 120. However, the disclosure is not limited thereto. In some other embodiments, the first camera unit 110 and/or the second camera unit 120 can be separately disposed from the electronic apparatus 100. In other words, the first camera unit 110 and/or the second camera unit 120 can be a stand-alone camera, a portable camera, an external camera accessory outside the electronic apparatus 100. The external camera unit (e.g., the first camera unit 110 and/or the second camera unit 120) can be wirelessly paired with the electronic apparatus 100, or electrically coupled to the electronic apparatus 100 via a connection wiring.

The first camera unit 110 is configured to generate a first media data (e.g., capture a first image or record a first video) according to instructions from users. The second camera unit 120 is configured to generate a second media data (e.g., capture a second image or record a second video) according to instructions from users. In a conventional device, two camera units (e.g., the first camera unit 110 and the second camera unit 120) are triggered to generate the images/videos separately by different user instructions, and the output images/videos are usually stored separately without integration.

In some embodiments of the disclosure, the control unit 130 is adapted to perform a controlling method for generating the first media data by the first camera unit 110 and the second media data by the second camera unit 120 in sequence, and further for integrating the first media data and the second media data into a third media data. The details of aforesaid controlling method are explained in following paragraphs.

Figure 2:
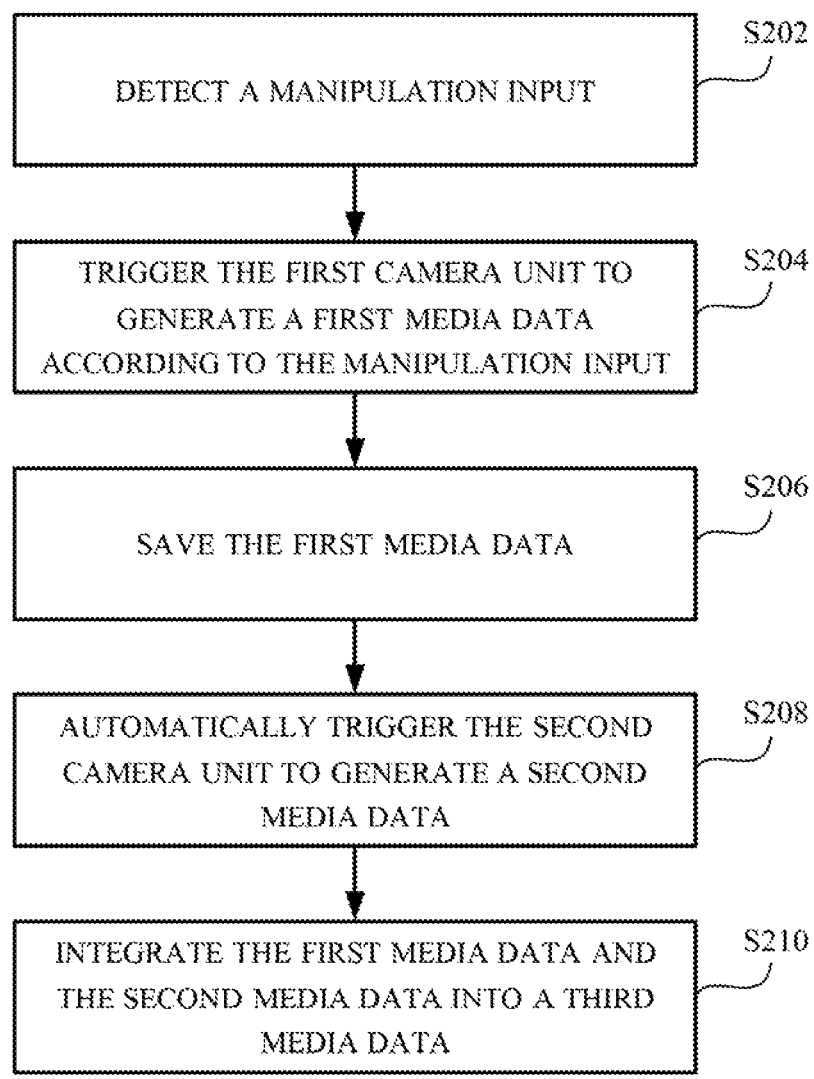
FIG. 2 is a flow diagram illustrating a controlling method according to one embodiment of the present disclosure.

Reference is made to FIG. 2, which is a flow diagram illustrating a controlling method 200 according to one embodiment of the present disclosure. The controlling method 200 is suitable to be utilized on the electronic apparatus 100 including the first camera unit 110 and a second camera unit.

In step S202, the control unit 130 is configured to detect a manipulation input from an input interface (not shown in FIG. 1) of the electronic apparatus 100. For example, the manipulation input can be detected by a shutter key, a switch button or a virtual shutter button on a touch panel of the electronic apparatus 100.

In step S204, the control unit 130 is configured to trigger the first camera unit 110 to generate a first media data by shooting a first image or recording a first video. In other words, the first media data can be the first image or the first video depending on the user's manipulation input. For example, the first camera unit 110 is triggered to capture the first image in response to a click gesture, and the first camera unit 110 is triggered to capture the first video in response to a long-press gesture.

In some embodiments, the display unit 150 of the electronic device 100 is configured to display a preview image/video captured by the first camera unit 110 in real time. However, the display unit 150 is not limited to be an internal display unit of the electronic device 100. In some other embodiments, the display unit 150 can be an external display unit wirelessly communicated with the control unit 130.

In step S206, the first media data (i.e., the first image or the first video) are saved. In some embodiments, the first image or the first video is temporarily stored in a register or a temporary memory. In some embodiments, the first image or the first video is stored in the storage unit 140.

Afterward, step S208 is performed automatically in response to the first media data is generated (i.e., steps S204 and S206), the control unit 130 is configured to trigger the second camera unit 120 to generate a second media data by shooting a second image or recording a second video.

In some embodiments, the display unit 150 of the electronic device 100 is configured to display a preview image/video captured by the second camera unit 120 in real time.

In some embodiments, the second media data (i.e., the second image or the second video) is temporarily stored in a register or a temporary memory. In some embodiments, the second image or the second video is stored in the storage unit 140.

In step S210, the first media data and the second media data are integrated into a third media data, and the third media data are stored in the storage unit 140.

Based on aforesaid embodiments, the controlling method 200 is able to generate the first media data by the first camera unit 110 and the second media data by the second camera unit 120 in sequence according to the manipulation input. The second camera unit 120 is activated automatically by the controlling method 200 after the first media data is generated. Therefore, the user is not required to perform a complex manipulation procedure (e.g., a shutter instruction to the first camera unit 110, a switch instruction to activate the second camera unit 120 and another instruction to the second camera unit 120) to capture the first media data and the second media data from two different camera units.

Figure 3:
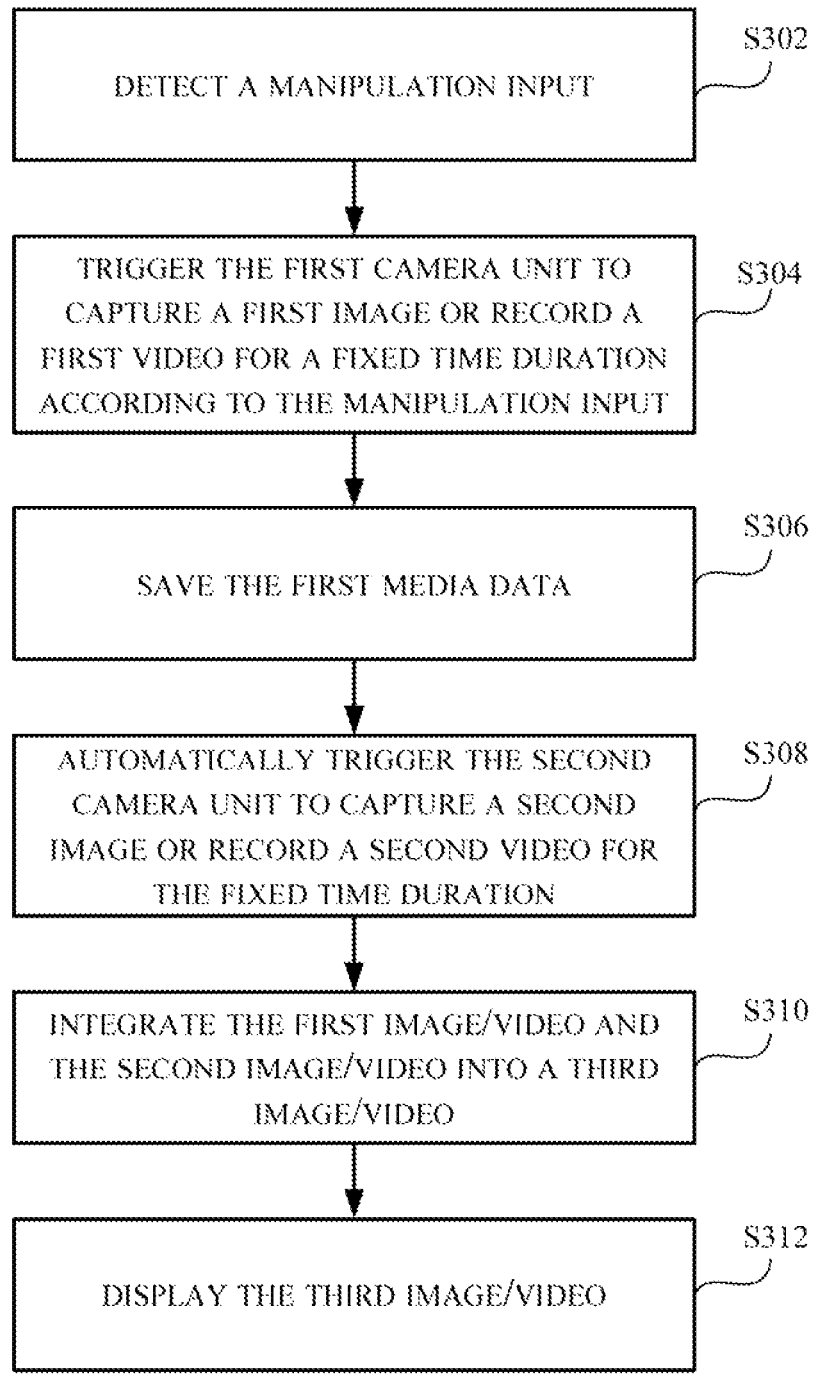
FIG. 3 is a flow diagram illustrating a controlling method according to one embodiment of the present disclosure.

Reference is made to FIG. 3, which is a flow diagram illustrating a controlling method 300 according to one embodiment of the present disclosure. The controlling method 300 is suitable for the first camera unit 110 and the second camera unit 120 mentioned above.

In step S302, the control unit 130 is configured to detect a manipulation input from an input interface.

In step S304, the control unit 130 is configured to trigger the first camera unit 110 to generate the first media data by capturing the first image or recording the first video for a time duration according to the manipulation input. The time duration can be predetermined by the electronic apparatus 100 (e.g., 3 seconds, 10 seconds, 5 minutes, etc.) or defined by the manipulation input (e.g., according to a holding duration of the manipulation input). In step S306, the first image or the first video is saved.

Afterward, step S308 is performed automatically in response to the first media data is generated (i.e., steps S304 and S306), the control unit 130 is configured to trigger the second camera unit 120 to generate the second media data by capturing the second image or recording the second video for the same time duration (identical to the fixed time duration of the first video).

In some embodiments, the second image or the second video is temporarily stored in a register. In some embodiments, the second image or the second video is stored in the storage unit.

In step S310, the control unit is configured to integrate the first media data and the second media data into a third media data. In the present embodiment, if the first media data and the second media data are both images, the first image and second image are integrated into a third image. For example, the first image and second image are stitched side-by-side into the third image. If one of the first media data and the second media data includes a video, the first media data and the second media data are integrated into a third video. For example, the first image/video and second image, video are stitched side-by-side into the third video.

Figure 4A:
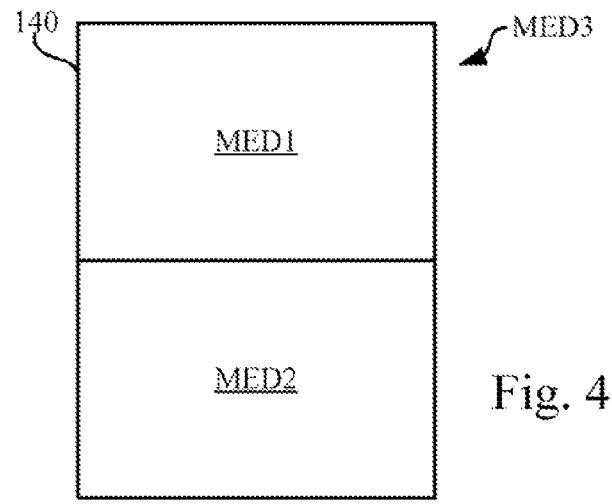
FIG. 4A, FIG. 4B and FIG. 4C are schematic diagrams illustrating the distributions of the first media data and the second media data in the third media data.
Figure 4B:
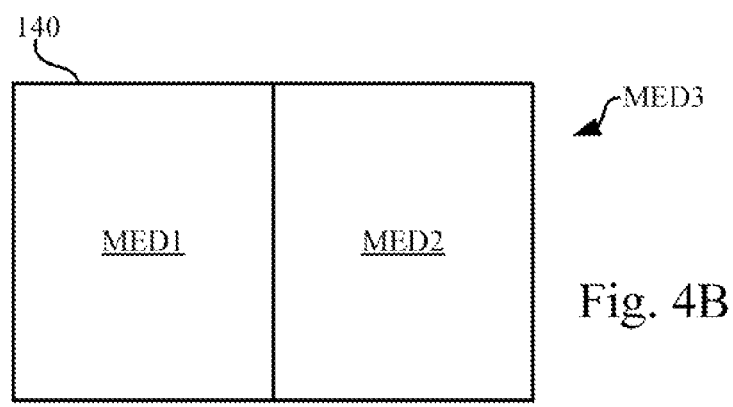
Figure 4C:
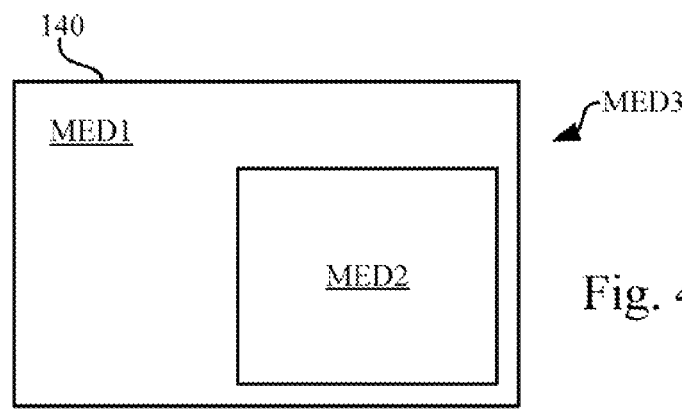

In step S312, the display unit 150 is configured to display the third media data (the third image/video). Reference is also made to FIG. 4A, FIG. 4B and FIG. 4C, which are schematic diagrams illustrating the distributions of the first media data MED1 and the second media data MED2 in the third media data MED3.

When the third media data MED3 is displayed, the first media data MED1 and the second media data MED2 are co-existed (or juxtaposed) and simultaneously displayed in a split screen during at least a frame of the third media data MED3.

As shown in FIG. 4A, the third media data MED3 (e.g., the third image/video) includes a split screen. The first media data MED1 (e.g., the first image/video) is located in the upper split column. The second media data MED2 (e.g., the second image/video) is located in the lower split column.

As shown in FIG. 4B, the third media data MED3 (e.g., the third image/video) includes a split screen. The first media data MED1 (e.g., the first image/video) is located in the left split column. The second media data MED2 (e.g., the second image/video) is located in the right split column.

As shown in FIG. 4C, the third media data MED3 (e.g., the third image/video) includes a split screen. The first media data MED1 (e.g., the first image/video) is located in the surrounding split column. The second media data MED2 (e.g., the second image/video) is located in the central split column.

When the first media data. MED1 and the second media data MED2 are the first image and the second image, the third media data MED3 is a stitched image including contents of the first image and the second image (referring to FIG. 4A-FIG. 4C).

Figure 5A:
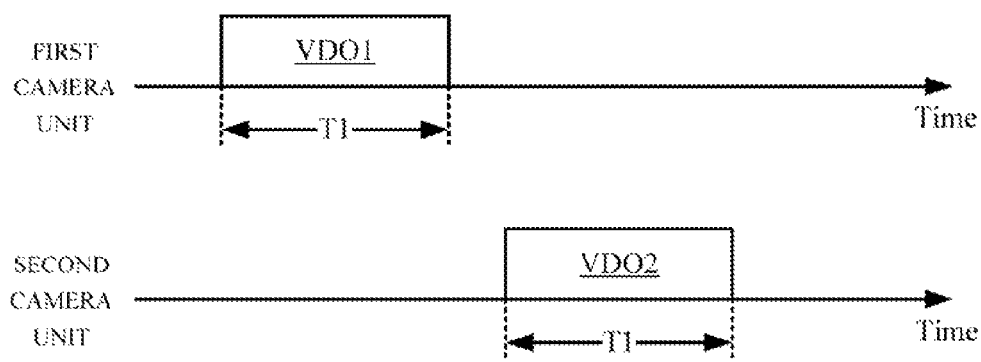
FIG. 5A is a timeline diagram illustrating an example that the first media data is the first video and the second media data is the second video according to an embodiment.
Figure 5B:
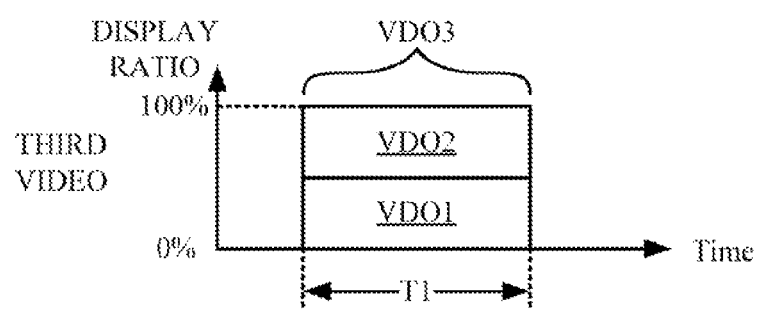
FIG. 5B is a schematic diagram illustrating the third video integrated from the first video and the second video in FIG. 5A.

Reference is also made to FIG. 5A and FIG. 5B. FIG. 5A is a timeline diagram illustrating an example that the first media data MED1 is the first video VDO1 recorded by the first camera unit 110 and the second media data MED2 is the second video VDO2 recorded by the second camera unit 120 according to an embodiment. FIG. 5B is a schematic diagram illustrating the third video VDO3 (i.e., the third media data MED3) integrated from the first video VDO1 and the second video VDO2 in FIG. 5A.

As shown in FIG. 5A, the first video VDO1 is recorded by the first camera unit 110 for a time duration T1, and the second video is recorded by the second camera unit 120 for the same time duration T1. As shown in FIG. 5B, the first video VDO1 and the second video VDO2 are stitched into the third video VDO3. The first video VDO1 and the second video VDO2 are co-existed (or juxtaposed) and simultaneously displayed in a split screen during the third video VDO3 (referring to FIGS. 4A-4C). The third media data MED3 is a stitched third video VDO3 including two split columns. The second video VDO2 is played in one split column while the first video VDO1 is played in the other split column for the time duration T1.

Figure 6A:
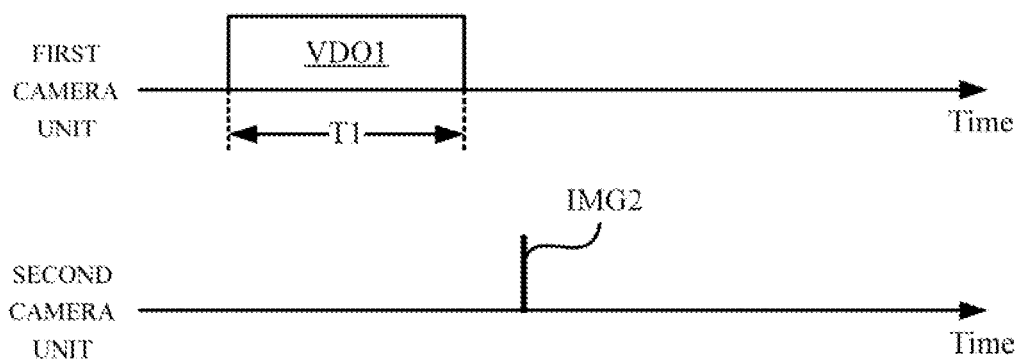
FIG. 6A is a timeline diagram illustrating an example that the first media data is the first video and the second media data is the second image according to an embodiment.
Figure 6B:
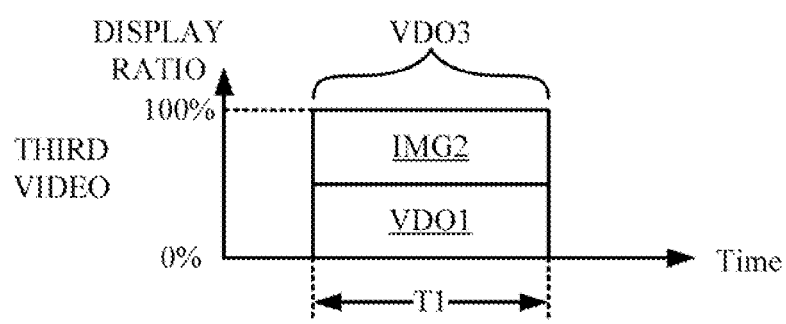
FIG. 6B is a schematic diagram illustrating the third video integrated from the first video and the second image in FIG. 6A.

Reference is also made to FIG. 6A and FIG. 6B. FIG. 6A is a timeline diagram illustrating an example that the first media data MED1 is the first video VDO1 recorded by the first camera unit 110 and the second media data MED2 is the second image IMG2 captured by the second camera unit 120 according to an embodiment. FIG. 6B is a schematic diagram illustrating the third video VDO3 (i.e., the third media data MED3) integrated from the first video VDO1 and the second image IMG2.

As shown in FIG. 6A, the first video VDO1 is recorded by the first camera unit 110 for the time duration T1, and afterward the second image IMG2 is captured by the second camera unit 120. As shown in FIG. 6B, the first video VDO1 and the second image IMG2 are stitched into the third video VDO3, and the third video VDO3 displayed on the display unit 150 lasts for the time duration T1. In this case, the third media data MED3 is a stitched third video VDO3 including two split columns. The second image IMG2 is fixedly displayed in one split column while the first video VDO1 is played in the other split column.

In some embodiments, a ratio of sizes corresponding to the first image/video and the second image/video is predetermined. In some other embodiments, a resolution of the third image/video is determined based on the smallest resolution of the first image/video and the second image/video.

Figure 7:
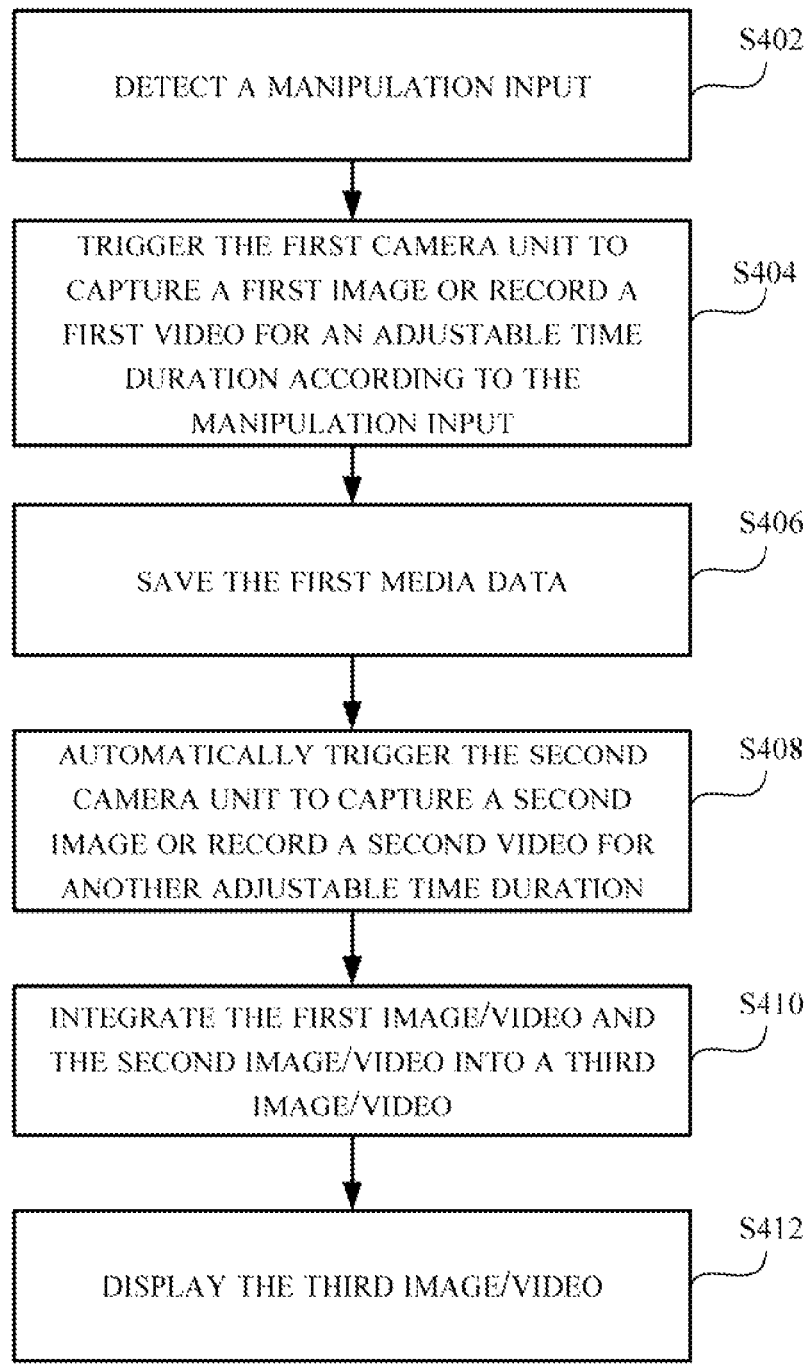
FIG. 7 is a flow diagram illustrating a controlling method according to one embodiment of the present disclosure.

Referring to FIG. 7, which is a flow diagram illustrating a controlling method 400 according to one embodiment of the present disclosure. The controlling method 400 is suitable for the first camera unit 110 and the second camera unit 120 mentioned above. The steps S400~S412 of the controlling method 400 are similar to the steps S300~S312 of the controlling method 300 in aforesaid embodiment.

It is noticed that, the first video VDO1 and the second video VDO2 are not limited to be recorded by the same time duration. In this embodiment, step S404 is performed to trigger the first camera unit 110 to capture the first image IMG1 or record the first video VDO1 for an adjustable time duration according to the manipulation input, and step S408 is performed to automatically trigger the second camera unit 120 to capture the second image IMG2 or record the second video VDO2 for another adjustable time duration. In the embodiment, the time durations of the first video VDO1 and the second video VDO2 in the embodiment are both adjustable and not necessary the same.

Figure 8A:
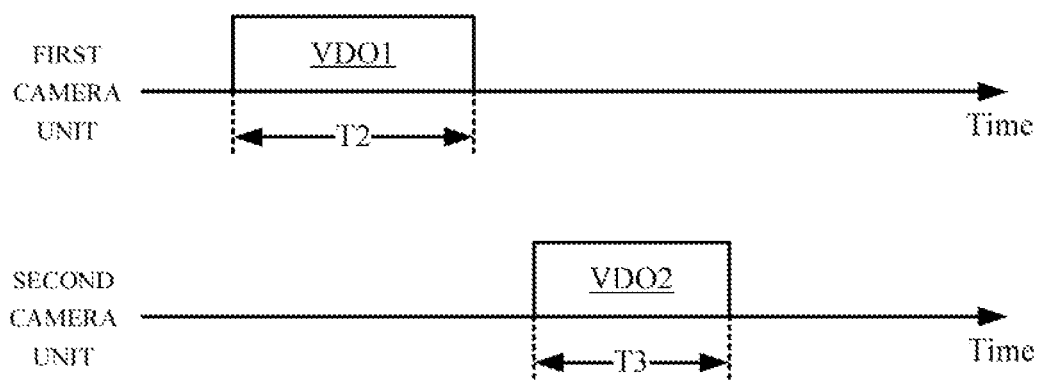
FIG. 8A is a timeline diagram illustrating an example that the first media data is the first video and the second media data is the second video according to an embodiment of the controlling method.
Figure 8B:
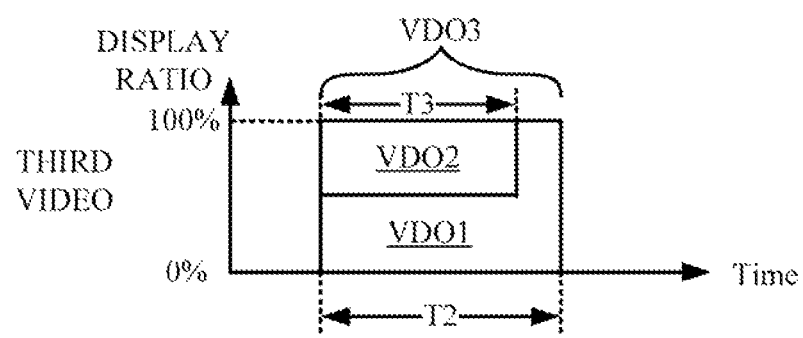
FIG. 8B is a schematic diagram illustrating the third video integrated from the first video and the second video in FIG. 8A.

Reference is also made to FIG. 8A and FIG. 8B. FIG. 8A is a timeline diagram illustrating an example that the first media data MED1 is the first video VDO1 recorded by the first camera unit 110 and the second media data MED2 is the second video VDO2 recorded by the second camera unit 120 according to an embodiment of the controlling method 400. FIG. 8B is a schematic diagram illustrating the third video VDO3 (i.e., the third media data MED3) integrated from the first video VDO1 and the second video VDO2 in FIG. 8A.

As shown in FIG. 8A, the first video VDO1 is recorded by the first camera unit 110 for a time duration T2, and then the second video VDO2 is recorded by the second camera unit 120 for a time duration T3, in which the time duration T2 is longer than the time duration T3. Subsequently, the first video VDO1 and the second video VDO2 are stitched into the third video VDO3 as shown in FIG. 8B.

When the display unit 150 displays the third video VDO3, a part of the third video VDO3 (for the time duration T3 from the beginning) is a stitched video includes two split columns, the second video VDO2 is played in one split column while the first video VDO1 is played in the other split column. Another part of the third video VDO3 (the rest of the third video VDO3 after the time duration T3) is a full-screen video playing the first video VDO1. Similarly, the relationships between the first video VDO1 and the second video VDO2 can be alternated by a person in the art if the time duration T3 is longer.

Figure 9A:
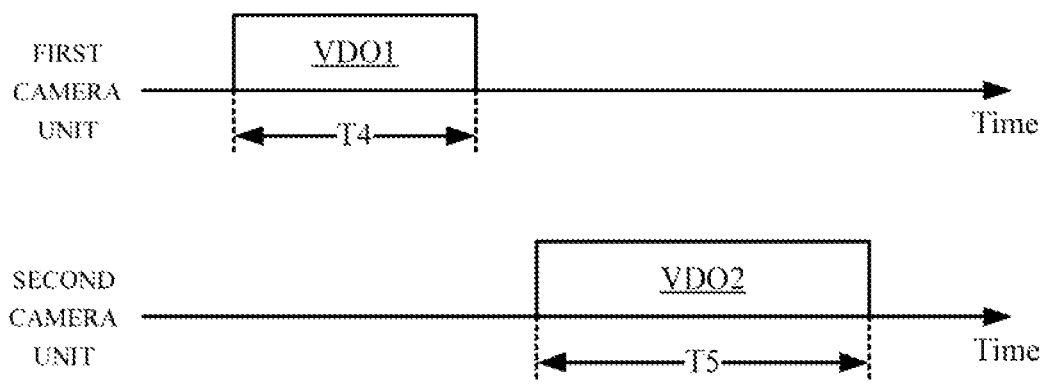
FIG. 9A is a timeline diagram illustrating an example that the first media data is the first video and the second media data is the second video according to an embodiment of the controlling method.
Figure 9B:
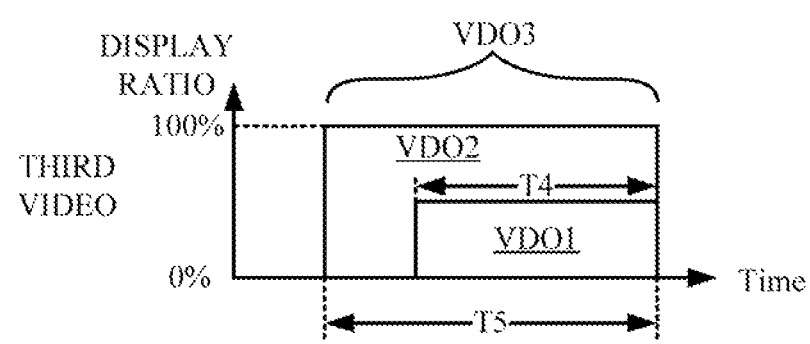
FIG. 9B is a schematic diagram illustrating the third video integrated from the first video and the second video in FIG. 9A.

Reference is also made to FIG. 9A and FIG. 9B. FIG. 9A is a timeline diagram illustrating an example that the first media data MED1 is the first video VDO1 recorded by the first camera unit 110 and the second media data MED2 is the second video VDO2 recorded by the second camera unit 120 according to another embodiment of the controlling method 400. FIG. 9B is a schematic diagram illustrating the third video VDO3 (i.e., the third media data MED3) integrated from the first video VDO1 and the second video VDO2 in FIG. 9A.

As shown in FIG. 9A, the first video VDO1 is recorded by the first camera unit 110 for a time duration T4, and then the second video VDO2 is recorded by the second camera unit 120 for a time duration T5, in which the time duration T5 is longer than the time duration T4. Subsequently, the first video VDO1 and the second video VDO2 are stitched into the third video VDO3 as shown in FIG. 9B.

When the display unit 150 displays the third video VDO3, the second video VDO2 is displayed for a time duration of length (T5–T4) first in a full-screen mode (i.e., the display ratio is 100%), and then the first video VDO1 and the second video VDO2 are simultaneously displayed for the time duration T4.

Based on the disclosure mentioned above, the operations of the controlling methods require fewer steps for the user to capture/record two consecutive images/videos and to stitch the images/videos into a single image/video.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A controlling method, suitable for a first camera unit and a second camera unit, the controlling method comprising:
   triggering the first camera unit to generate a first media data by shooting a first image or recording a first video;
   in response to the first media data is generated, automatically triggering the second camera unit to generate a second media data by shooting a second image or recording a second video; and
   integrating the first media data and the second media data into a third media data, wherein when the first media data comprises the first video, the second media data comprises the second video and the second video is recorded with a second time duration different from a first time duration of the first video, a first part of the third media data is a stitched video comprising a first split column and a second split column, the second video is played in the second split column while the first video is played in the first split column, the first split column and the second split column of the third media data are juxtaposed and simultaneously displayed in the first part of the third media data, and a second part of the third media data is a full-screen video playing the first video or the second video.

2. The controlling method of claim 1, wherein, when the first media data and the second media data are the first image and the second image, the third media data is a stitched image comprising contents of the first image and the second image.

3. The controlling method of claim 1, wherein, when the first media data and the second media data comprises the first video and the second image, the third media data is the stitched video comprising the first split column and the second split column, the second image is fixedly displayed in the second split column while the first video is played in the first split column.

4. The controlling method of claim 1, wherein the first camera unit and the second camera unit are disposed in an electronic apparatus, or at least one of the first camera unit and the second camera unit is separately disposed from the electronic apparatus and wirelessly paired with or electrically coupled to the electronic apparatus.

5. An electronic apparatus, comprising:
   a control unit operatively connected to a first camera unit and a second camera unit, the control unit being adapted to:
   trigger the first camera unit to generate a first media data by shooting a first image or recording a first video;
   in response to the first media data is generated, automatically trigger the second camera unit to generate a second media data by shooting a second image or recording a second video; and
   integrating the first media data and the second media data into a third media data, wherein when the first media data comprises the first video, the second media data comprises the second video and the second video is recorded with a second time duration different from a first time duration of the first video, a first part of the third media data is a stitched video comprising a first split column and a second split column, the second video is played in the second split column while the first video is played in the first split column, the first split column and the second split column of the third media data are juxtaposed and simultaneously displayed in the first part of the third media data, and a second part of the third media data is a full-screen video playing the first video or the second video.

6. The electronic apparatus of claim 5, wherein, when the first media data and the second media data are the first image and the second image, the third media data is a stitched image comprising contents of the first image and the second image.

7. The electronic apparatus of claim 5, wherein, when the first media data and the second media data comprises the first video and the second image, the third media data is the stitched video comprising the first split column and the second split column, the second image is fixedly displayed in the second split column while the first video is played in the first split column.

8. The electronic apparatus of claim 5, wherein the first camera unit and the second camera unit are disposed in the electronic apparatus, or at least one of the first camera unit and the second camera unit is separately disposed from the electronic apparatus and wirelessly paired with or electrically coupled to the electronic apparatus.

* * * * *